UNITED STATES PATENT OFFICE.

AUGUST BLANK AND CARL HEIDENREICH, OF LEVERKUSEN, GERMANY, ASSIGNORS TO FARBENFABRIKEN VORM. FRIEDR. BAYER & CO., OF ELBERFELD, GERMANY, A CORPORATION OF GERMANY.

BLACK TRISAZO DYES.

1,056,493.  Specification of Letters Patent.  Patented Mar. 18, 1913.

No Drawing.  Application filed May 28, 1912.  Serial No. 700,169.

*To all whom it may concern:*

Be it known that we, AUGUST BLANK and CARL HEIDENREICH, doctors of philosophy, chemists, citizens of the German Empire, residing at Leverkusen, Germany, have invented new and useful Improvements in New Black Trisazo Dyes, of which the following is a specification.

Our invention relates to the manufacture and production of new black cotton dyestuffs, which are obtained by diazotizing the intermediate products obtained from 1 molecule of a tetrazotized para-diamino-diphenylamin compound and 1 molecule of an aminonaphthol sulfonic acid such as 2.5.7-or 2.8.6-aminonaphthol sulfonic acid and combining the tetrazo compound thus obtained with 2 molecules of a meta-aminophenylglycin or with 1 molecule of such a glycin and 1 molecule of another azo dyestuff component. These new black dyestuffs are after being dried and pulverized in the shape of their alkaline salts black powders soluble in hot water with a black coloration. They yield upon treatment with stannous chlorid and hydrochloric acid a para-diamino-diphenylamin compound, a diaminonaphthol sulfonic acid and a glycin of a triaminobenzene. They are especially valuable for the dyeing of cotton goods and are distinguished by their great fastness to light. The shades obtained from these dyes are rendered very fast to washing by an after-treatment on the fiber with formaldehyde.

In order to illustrate the new process more fully the following examples are given, the parts being by weight—

Example 1: 19.9 parts of para-diaminodiphenylamin are diazotized in the usual way with 13.8 parts of sodium nitrite and 65 parts of hydrochloric acid. The tetrazo solution is quickly added to a solution—cooled to 0° C.—of 23.9 parts of 2.8.6-aminonaphthol-sulfonic acid in 500 parts of water and 42 parts of soda. The mixture is then acidulated with 105 parts of hydrochloric acid and diazotized with a solution 6.9 parts of sodium nitrite which requires about 2–4 hours stirring at a temperature of 0° C. subsequently a solution of 33.2 parts of meta-aminophenylglycin in 500 parts of water and 42 parts of soda is cooled to about 0–5° C. and the above mentioned tetrazo compound is run into it. After several hours the mixture is heated to 50° C. and the dyestuff is salted out.

The dyestuffs correspond to the formula:

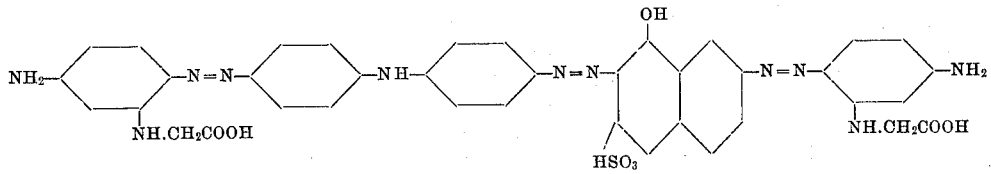

It dyes cotton in full black shades which are fast to washing after treatment with formaldehyde. The new dye is after being dried and pulverized in the shape of its sodium salt a black powder which is soluble in hot water with a black coloration and which is soluble in concentrated sulfuric acid with a blue-black coloration. It yields upon treatment with stannous chlorid and hydrochloric acid para-diamino-diphenylamin, 2.7-diamino- 8 -naphthol- 6 -sulfonic acid and the glycin of 1.2.4-triaminobenzene. One molecule of meta-aminophenylglycin may be replaced by resorcin, etc.

Example 2: 21.3 parts of para-diamino-phenyltolylamin are tetrazotized as before described and combined with a solution of 23.9 parts of 2.5.7-aminonaphthol sulfonic acid in 500 parts of water and 42 parts of soda. The intermediate product is further diazotized with 6.9 parts of sodium nitrite and 105 parts of hydrochloric acid. A neutral solution of 16.6 parts of meta-aminophenylglycin is added to the diazo compound and then sodium acetate until the meta-aminophenylglycin has disappeared. Subsequently a solution of 11 parts of resorcin is added and the solution is rendered alkaline with soda. After several hours the dyestuff is salted out. It dyes cotton in a bluish-black shade, which when aftertreated with formaldehyde changes to a full black fast to washing and to light.

We claim:—

Similar dyestuffs can be obtained by replacing in these examples the meta-aminophenylglycin by meta-aminotolylglycin, etc.

1. As new products the new black cotton trisazo dyestuffs which are after being dried and pulverized in the shape of their alkaline salts black powders soluble in hot water with a black coloration; yielding upon treatment with stannous chlorid and hydrochloric acid a para-diamino-diphenylamin compound, a diaminonaphthol sulfonic acid and a glycin of a triaminobenzene; dyeing cotton in full black shades which are fast to washing after treatment with formaldehyde, substantially as described.

2. As a new product the herein described new black cotton trisazo dyestuff, which is after being dried and pulverized in the shape of its sodium salt a black powder soluble in hot water with a black coloration and soluble in concentrated sulfuric acid with a blue-black coloration; yielding upon treatment with stannous chlorid and hydrochloric acid para-diaminodiphenylamin, 2.7-diamino-8-naphthol-6-sulfonic acid and the glycin of 1.2.4-triaminobenzene; dyeing cotton in full black shades which are fast to washing and to light after treatment with formaldehyde, substantially as described.

In testimony whereof we have hereunto set our hands in the presence of two subscribing witnesses.

AUGUST BLANK. [L. S.]
CARL HEIDENREICH. [L. S.]

Witnesses:
 HELEN NUFER,
 ALBERT NUFER.

Copies of this patent may be obtained for five cents each, by addressing the "Commissioner of Patents, Washington, D. C."